United States Patent [19]

Yeo

[11] 3,779,291

[45] Dec. 18, 1973

[54] PIN STRAIGHTENING MACHINE

[75] Inventor: Herbert G. Yeo, Lincoln, R.I.

[73] Assignee: Augat, Inc., Attleboro, Mass.

[22] Filed: May 11, 1972

[21] Appl. No.: 252,489

[52] U.S. Cl. ............... 140/147, 72/DIG. 10, 72/112

[51] Int. Cl. ............................................ B21f 1/02

[58] Field of Search ...................... 29/203 B, 203 D, 29/203 J, 203 P, 630 A, 630 D; 72/112, 125, DIG. 10; 140/147, 149

[56] References Cited

UNITED STATES PATENTS

| | | | |
|---|---|---|---|
| 2,609,858 | 9/1952 | Engel | 72/112 |
| 2,971,555 | 2/1961 | Paulson | 72/125 |
| 3,580,297 | 5/1971 | Spadoni et al. | 140/149 |
| 3,349,813 | 10/1967 | Patuszak | 140/147 |
| 3,603,357 | 9/1971 | Drummond | 140/147 |
| 3,664,016 | 5/1972 | Sevc et al. | 29/203 D |
| 3,700,011 | 10/1972 | Walter | 140/147 |

*Primary Examiner*—Charles W. Lanham
*Assistant Examiner*—E. M. Combs
*Attorney*—Joseph Weingarten et al.

[57] ABSTRACT

A machine for straightening the pins secured to a multiple pin board. The pins are simultaneously inserted through holes in a plate which is movable with respect to the pin board. Through an arrangement of gears which provide the relative motion between the plate and the pin board, this motion is carefully timed and controlled as to the amount, direction and sequence of relative motion imparted. All of the pins on the pin board are acted upon simultaneously so that at the end of the operation any axial deformity of any of the pins is corrected and all of the pins stand parallel to each other and perpendicular to the plane of the pin board.

13 Claims, 6 Drawing Figures

PIN STRAIGHTENING MACHINE

FIELD OF THE INVENTION

This invention relates to multiple pin boards and more particularly concerns a machine for simultaneously acting upon all of the pins of such boards in such a manner that the pins are perpendicular to the plane of the board and are parallel to each other upon completion of the machine operation.

DISCUSSION OF THE PRIOR ART

Electrical wiring boards having a multiplicity of pins are widely used in the electronics industry, especially in computers and telephone exchanges where the number of wiring connections are in the thousands. Such boards are often printed circuit boards but may be merely a means for conveniently providing high density wiring connections. Several forms of solderless connectors are available for connecting wires to such pins, one particular type being commonly referred to as "wire wrapping." A wire wrapping gun is loaded with a predetermined length of wire which has the insulation stripped away an appropriate length from the end and the gun is then placed in a position to encircle the pin so that the wire may be tightly wrapped around it. There is very little room for tolerance in the positioning of the chuck of the gun with respect to the pins, partly because the pins may be only 0.100 inch apart, and partly because machines which automatically position the gun can accommodate very little positional tolerance. It is therefore necessary that the pins at all times be at their proper orientation with respect to the surface of the board, that is, perpendicular to the board. Since these pins are relatively long and thin (approximately 5/8 inch long with a normally square cross-sectional thickness of approximately 0.025 inches), it is easily understood how they may become deformed in a lateral direction and bent out of their intended axial alignment during assembly and subsequent handling.

It is thus readily appreciated that the pins of a multiple pin board must be straight and parallel in order to function properly when they are interconnected with other pins and circuitry. This is necessary to facilitate connections thereto and to prevent electrical short circuits. Such straightening may be done by hand where the deformity is visually detected, but this of course is an inaccurate and time-consuming process. Machines have been devised for straightening leads of plural lead components such as transistors and dual lead components such as resistors and capacitors. These machines generally take a form of some type of clamping and bending or a tandem bending arrangement in the case of elongated wires or strips of material, generally metal. Another very expensive and time-consuming machine is available which individually straightens each pin in a multiple pin board. An efficient and effective machine for straightening and simultaneously orienting all of the pins in a multiple pin board has not previously been available.

SUMMARY OF THE INVENTION

Broadly speaking, this invention includes a plate having a multiplicity of holes for receiving the pins of the pin board. The relative motion between the plate and the pin board is caused by two eccentrics oriented at right angles to each other moving at different speeds to thereby cause varying orbital relative motion between the grid plate and the pin board. Either element may be moved with respect to the other but the particular embodiment shown herein holds the pin board while moving the grid plate. The openings in the grid plate are appropriately beveled to receive pins which may have been bent somewhat from their prescribed positions. The pins are laterally deformed by the above-mentioned orbital motion in such a manner that any previous misalignment is counteracted. The pins are caused to be bent simultaneously and in different directions sequentially to a final position which is directly perpendicular to the surface of the pin board. This motion is accomplished by a plurality of gears coupled to a motor, two of which gears are coupled orthogonally to the grid plate to cause reciprocal planar motion thereof. Timing means are also coupled to the gear train for appropriate timing and switching of the machine operation. A second switch controlled by an angularly adustable camming device controls the final motion of the machine which leaves the pins perpendicular to the board.

While the eccentrics controlling the relative motion between the pin board and the grid plate are 90° apart with respect to the center of the grid plate, they rotate at different speeds thereby causing orbital motion which is constantly shifting its primary axis through the period of operation of the machine.

BRIEF DESCRIPTION OF THE DRAWING

The objects, advantages and features of this invention will be more clearly understood from the following detailed description taken in conjunction with the accompanying drawing in which.

DESCRIPTION OF THE PREFERRED EMBODIMENT

Figures 1, 2:
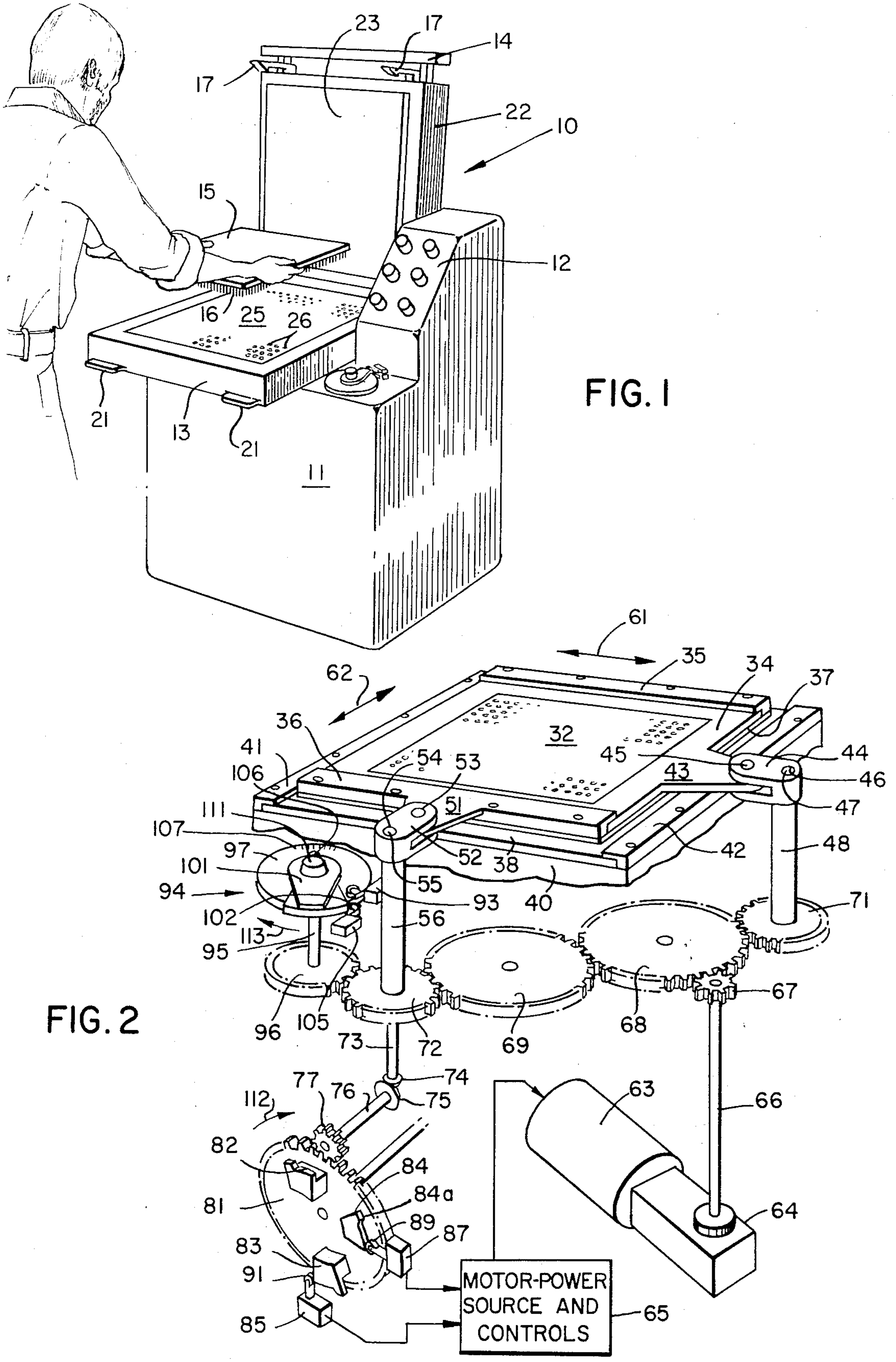
FIG. 1 is a perspective view of a machine constructed in accordance with the principles of this invention.
FIG. 2 is a diagrammatic perspective of the moving parts of the machine of FIG. 1.

With reference now to the drawing, and more particularly to FIG. 1 thereof, there is shown a pin straightening machine 10 having a housing 11, control panel 12, operating table 13 and clamping cover 14. A pin board 15 having a multiplicity of pins 16 mounted thereto is shown in position for placement onto table 13 prior to the straightening operation to be performed thereupon. When pin board 15 is positioned onto table 13, clamping cover 14 is pivoted downward to hold the pin board in position to be operated upon by the machine. Latches 17 engage lock projections 21 on the operating table to maintain the clamping cover and the pin board in proper position during operation of the machine. The clamping cover hinges and the locking means may be made to accommodate boards of widely varying thickness as desired.

Cover 14 is comprised of a main element 22 which may be made of any of several relatively rigid materials such as metal or wood and a resilient facing pad 23 which contacts the top of board 15. Table 13 includes an upper grid plate 25 which is formed with a multiplicity of holes 26 constructed to receive pins 16 of the pin board. The upper grid plate is fixed relative to table 13 and holds the pin board in position while mechanism within the table acts upon the pins mounted thereto. Given a standard modular hole spacing in the grid plate of 0.1 inch in each direction, the machine may accommodate any size or shape pin board up to the overall dimensions of the grid plate, provided that pins in the board are spaced by 0.1 inch or any multiple thereof. Normal spacing for pins on wire wrap boards is 0.1 inch between pins in a row and 0.3 inch between rows. Of course, other spacings may be used and for boards having pins of different, non-modular spacings, different grid plates would be necessary and could easily be provided.

Figure 5:
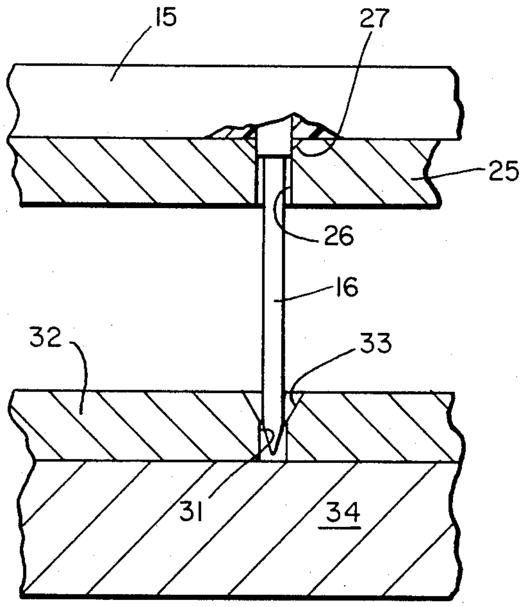
FIG. 5 is an enlarged partial sectional view showing one pin of the pin board as it is mounted in the machine.

With reference now to FIG. 5, it may be seen how the pins 16 of pin board 15 are received in holes 26 of upper grid plate 25 which has a beveled entrance 27. Pins 16 extend through upper grid plate 25 and into holes 31 in lower grid plate 32, which plate is parallel to and spaced from the upper grid plate. A pronounced bevel 33 guides the tips of pins 16 into holes 31. Since it is likely that some of the pins of board 15 will be somewhat misaligned, it is readily appreciated that there is a necessity for having beveled entrances 27 and 33 to guide the pins into the proper holes in the respective grid plates.

Lower grid plate 32 is mounted to orbiting base 34 which is slidably mounted between channel members 35 and 36 as shown in FIG. 2. These channel members along opposite sides of orbiting base 34 are mounted to filler 37 and slide plate 38 which in turn is mounted for reciprocal motion between channel members 41 and 42, these channel members being secured to base 40 of operating table 13 of the machine. Orbiting base 34 is formed with projecting tab 43 which is pivotally coupled to connecting link 44 by means of pivot pin 45. Link 44 has a bore 46 at the end opposite pivot pin 45, which bore is adapted to receive eccentric pin 47 formed on the end of shaft 48. Similarly, channel member 36 is formed with projecting tab 51 which is pivotally coupled to connecting link 52 by means of pivot pin 53. Link 52 is also formed with bore 54 for receiving eccentric 55 formed on the end of shaft 56.

From the ahove description it may be seen that orbiting base 34 to which lower grid plate 32 is mounted is caused to move in the reciprocal direction indicated by arrow 61 when shaft 48 rotates and is caused to move in the reciprocal direction indicated by arrow 62 when shaft 56 rotates. These reciprocal distances are approximately 0.070 inch in each direction from a home, or centered, position. By carefully timing the relative speeds of rotation of these shafts as will be discussed hereinbelow, the motion of grid plate 32 may be carefully defined in the changing planar orbital patterns indicated in FIGS. 3 and 4.

The rotation of shafts 48 and 56 is controlled through a gear train coupled to motor 63 through speed reducer 64. Motor 63 is powered and controlled in speed and direction through appropriate conventional means as indicated schematically by reference numeral 65. Speed reducer 64 also includes appropriate means for transmitting the rotational motion of the motor to shaft 66 for rotation thereof. Shaft 66 is connected to drive pinion 67 which rotates idler gear 68. Gear 68 in turn causes rotation of working gear 71 which is coupled to shaft 48 to impart reciprocal motion to base 34 through eccentric 47 as indicated by arrow 61. Shaft 56 is mounted to working gear 72 which is caused to rotate by means of idler gear 69 coupled between it and idler gear 68. Rotation of shaft 56 causes motion of slide plate 38 in the direction of arrow 62 through the means of eccentric 55. Idler gears 68 and 69 are of equal size and therefore rotate at equal speeds. However, the number of teeth of gears 72 and 71 differs by a ratio of 9:8 so that for every nine revolutions of gear 71, gear 72 rotates eight times. The motion imparted to lower grid plate 32 by this arrangement of gears is described by FIG. 3A–3H and the total composite motion of one complete cycle shown in FIG. 4.

Figure 3:
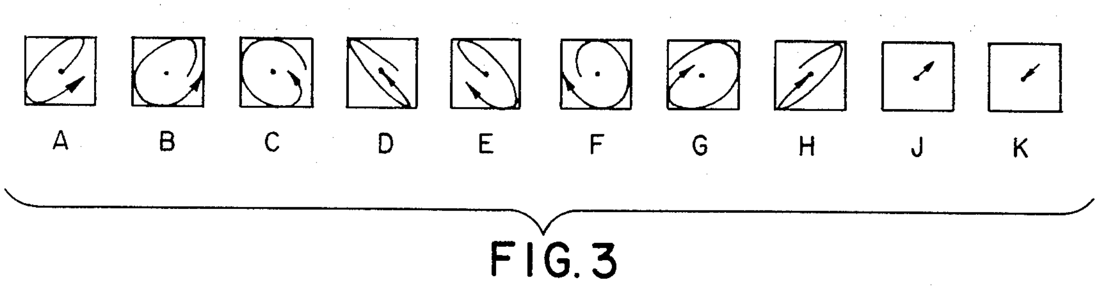
FIG. 3(A–K) depicts the cyclic sequences of relative motion between the grid plate and the pin board.
Figure 4:
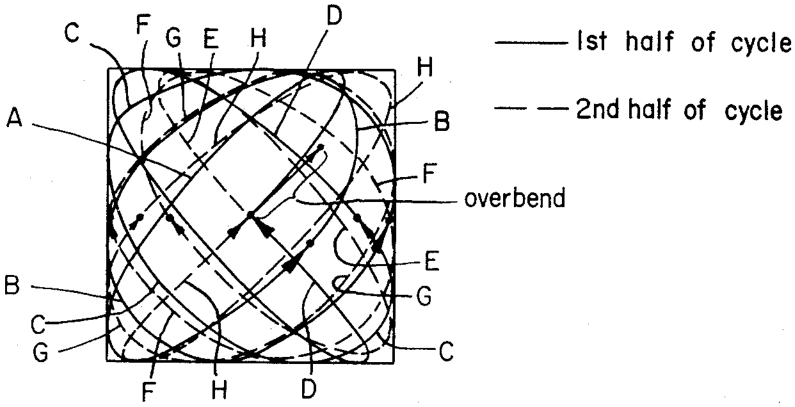
FIG. 4 is a composite motion diagram, a combination of the separate diagrams of FIG. 3 showing the continuous relative motion of the machine through one full cycle.

The purpose of the orbital motion shown in FIGS. 3 and 4 is to ensure that the pins of the pin board which are being acted upon come to a position parallel with one another. Each pin which may be misaligned to some degree before the board is mounted to table 13 must be brought into proper alignment with all of the other pins and made to stand perpendicular to the board. However, it is evident that if a pin is bent only to the perpendicular position from a misaligned position, a certain amount of resiliency or hysteresis remains in the pin metal and unless the elastic limit of the pin is exceeded by an amount equal to that which caused the initial deformity and is applied in the opposite direction, the pin will spring back somewhat towards its initial position, still out of alignment. By holding pin board 15 secure in upper grid plate 25, the motion imparted to lower grid plate 32 is such as to simultaneously bend all of the pins by a predetermined amount, exceeding the elastic limit of each of the pins as the motion depicted in FIG. 3 approaches the corners during the operating cycle. The actual distance a pin may be bent from its center position toward the corners by this machine is approximately 0.98 inch (distance from center to side of square of FIG. 3, 0.70 inch × 1.414).

This motion applies to all of the pins simultaneously. However, it should be realized that if all of the pins are thus bent in only one direction by the machine, a certain amount of preinduced deformity would remain, assuming that the previous deformities in several pins were in several different directions. It is therefore apparent that a more complex motion must be provided in order to achieve the desired results. It has been found that by bending all of the pins in several different directions sequentially and by providing a final centering correction the desired result may be realized. Such a sequence of motion of the bottom grid plate with respect to the pin board is shown by the diagrams of FIGS. 3A–3K. By going through the sequences depicted, any prestress in any pin will be removed and all of the pins will be parallel by the time this operation is completed. If the operation provided by the machine is concluded with FIG. 3H where the pins are returned to center, the last prior stress was toward the lower left and each of the pins will tend to lean in that direction. For this reason, a final motion ranging from 25° – 65° (FIG. 3J) is provided in the direction in which the pins were being bent at the end of the operation shown in FIG. 3H and then the motion is reversed to end at center as indicated by FIG. 3K. The amount of overbend provided by the approximate 45° rotation of shafts 48 and 56 indicated by FIG. 3J compensates for any residual bending remaining at the end of the operation shown in FIG. 3H. The final motion as indicated in FIG. 3K results in all of the pins being parallel to one another and perpendicular to pin board 15. As indicated previously, the motion of lower grid plate 32 with respect to pin board 15 is accomplished by means of the gear train already described. However, in order to properly start and stop the machine and to provide the overbend and return as indicated in FIGS. 3J and 3K, timing means operating through appropriate controls and switches are necessary.

Figure 6:
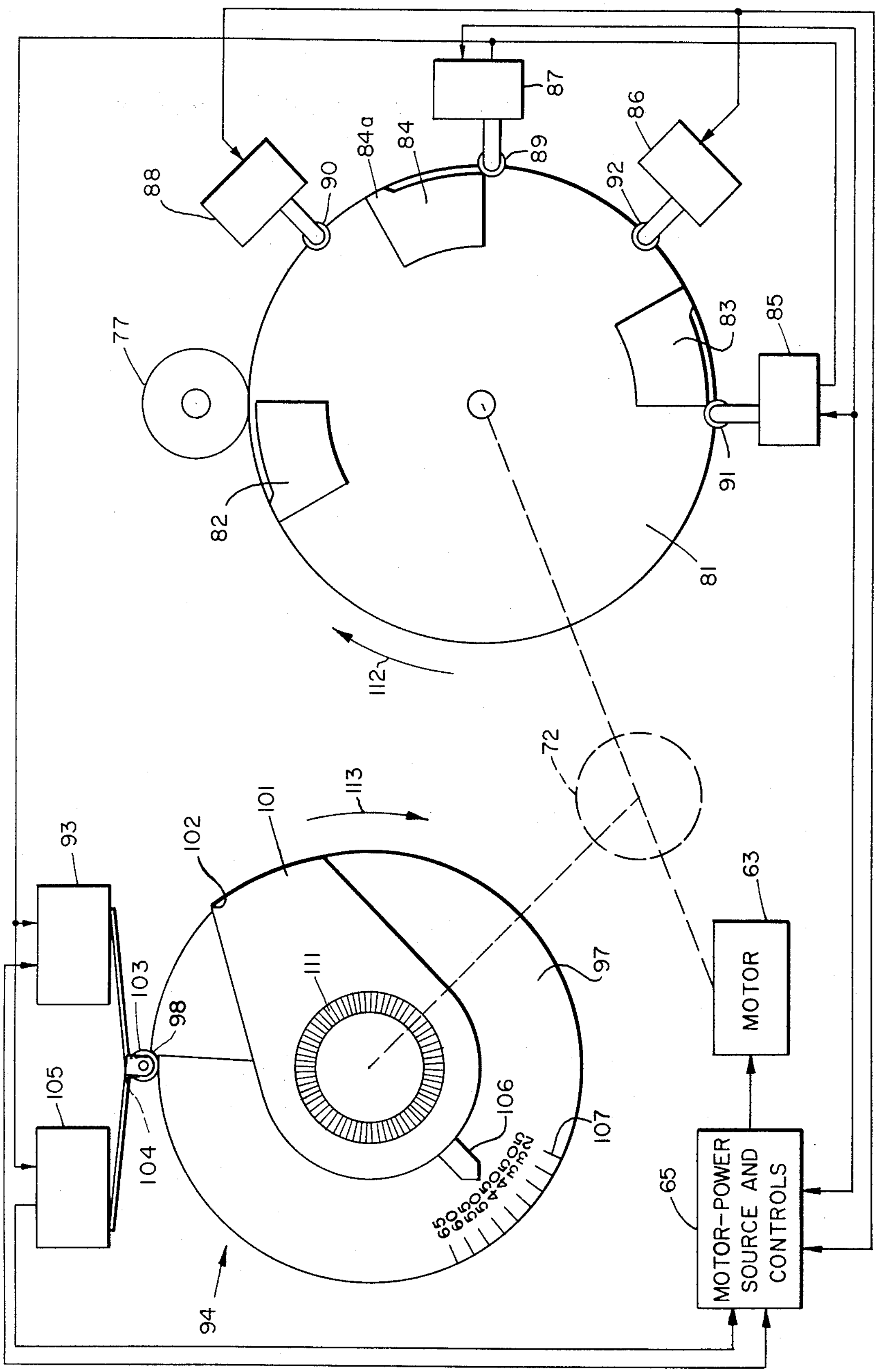
FIG. 6 is a diagrammatic representation of the switching and timing mechanisms of the machine of FIG. 1.

The controls and timing mechanism for this machine are shown in FIGS. 2 and 6. Extending from gear 72 coaxially with shaft 56 is shaft 73 which is coupled through bevel gears 74 and 75 to shaft 76 having pinion 77 affixed to the opposite end thereof. This pinion drives timing gear 81 which has switch actuating lobes 82, 83 and 84 mounted thereon. Lobes 82 and 83 are so constructed as to contact rollers 91 and 92 to operate switches 85 and 86 respectively while lobe 84 actuates switches 87 and 88 through rollers 89 and 90 respectively. After a board has been mounted in the machine for straightening of the pins extending therefrom, the appropriate switch (not identified) on control panel 12 is actuated energizing the machine to commence operation of motor 63 which, through the gear train, rotates timing gear 81. For a full cycle of operation timing gear 81 makes one full revolution. However, prior to completion of one revolution, lobe 84*a* of lobe 84 actuates switch 88 causing motor 63 to reduce speed significantly prior to stopping. This speed reduction takes place through approximately the last 180° of rotation of gear 72 and is desirable to insure accuracy of timing at the end of the operating cycle. When lobe 84 contacts roller 89 of switch 87, reversing switch 93 is energized and stopping switch 105 is enabled, thereby commencing the operational override portion of the machine cycle. This portion of the cycle, depicted in FIGS. 3J and 3K, will be discussed in detail below. All of the relays, switches and controls necessary for proper operation of the machine are included within schematic block 65 and are conventional devices which need not be further described here.

It has been found that a half cycle of the machine is often sufficient for relatively thin boards (in the range of 0.1 inch thick). Further, a half cycle may be sufficient for pins made of relatively soft material or pins which are of smaller than normal cross section. However, a full cycle is generally preferred to ensure complete pin straightening and it is likely that half cycle use of the machine of this invention would be the exception. If it is desired to utilize only a half cycle, a different switch on panel 12 is used to commence operation of the machine. Switches 85 and 86 are thereby energized in place of switches 87 and 88. Note that this operating pair of switches and lobes 82 and 83 are spaced from the plane of the surface of gear 81, while switches 87 and 88 along with lobe 84 are in a plane adjacent the surface of gear 81, between it and lobes 82 and 83. This prevents any possibility of interference between half cycle and full cycle switching controls. In operating through a half cycle, machine 10 will go through the motions indicated in FIGS. 3A–D, J and K (alternatively, FIGS. 3E–H, J and K). It will be noted that there is a high degree of similarity between FIG. 3D and FIG. 3H so that the final override and reversal indicated in FIGS. 3J and 3K performs substantially the same function as it would after a complete cycle of operation. However, the direction of the overbend operation will then be shifted by 90° to coincide with the angle of motion at the end of the half cycle shown in FIG. 3D.

As noted previously, timing gear 81 is driven by shaft 73 through bevel gears 74 and 75. Gears 74 and 75 have a size ratio of 1:2 so that shaft 73 makes two revolutions for each revolution of shaft 76. The relationship of the gear sizes between gear 72 and timing gear 81 is such that for eight revolutions of gear 72, gear 81 rotates once. For reference purposes, the time consumed by a full cycle is about 14 seconds and it is possible to load the machine, straighten the pins of the board or boards so loaded, and remove them in the space of 30 seconds. Thus it is possible for a single operator using this machine to perfectly straighten pins at the rate of many thousand per minute.

Adjustable override mechanism 94 is coupled to gear 72 by means of shaft 95 and gear 96 and controls the amount of overbend shown in FIGS. 3J and 3K. Gear 96 has the same size as gear 72 so that the override timing mechanism rotates at the same speed as gear 72. Override mechanism 94 is comprised of disk 97 having cam lobe 98, and an adjustable member 101 having cam lobe 102. Roller 103 of reversing switch 93 is on a level coincident with lobe 102 which rests on top of disk 97. Roller 104 (directly behind roller 103 in FIG. 6) of stopping switch 105 is below the level of roller 103 in order to be actuated by lobe 98 and not to be interfered with by lobe 102. A pointer 106 is provided for indicating the angle of adjustment of override mechanism 94 in conjunction with scale 107. The position of lobe 102 on disk 97 is adjusted by means of knob 111 which secures element 101 to disk 97 when fully tightened.

The operating sequence of the timing mechanism is as follows. For a full cycle the appropriate button on control panel 12 is actuated thereby enabling switches 87 and 88, and at the same time releasing the brake and engaging the clutch for rotation of motor 63 together with speed reducer 64. As indicated by the gearing arrangement described, timing gear 81 will rotate once while override mechanism 94 rotates eight times during full cycle operation. Roller 89 of switch 87 rides up over the leading edge of lobe 84 and rides over lobe 84*a* as timing gear 81 rotates in the direction of arrow 112. Lobes 82 and 83 contact rollers 91 and 92 but these switches are not enabled, so they perform no function during a full cycle. At the same time, the override mechanism rotates at an angular speed eight times that of timing gear 81 in the direction indicated by arrow 113, but no switching action takes place by means of switches 93 and 105 because these switches are not enabled until the end of one full revolution of the timing gear.

When lobe 84*a* actuates switch 88 through roller 90, the speed of motor 63 is reduced to approximately 25 percent of normal operating speed. It should be noted that operating speed and the reduced speed are variable and suitable controls are provided within housing 11 for such adjustments. When the leading edge of lobe 84 actuates switch 87, switches 93 and 105 are energized. The motor continues to operate so that override mechanism 94 rotates another short distance ranging from 25° to 65°, the distance normally being about 45°. At this point roller 103 contacts lobe 102 and reverses motor 63. The gear train, including override mechanism 94, reverses direction until roller 104 drops over lobe 98 and switch 105 is actuated, thereby stopping the motor at zero position as shown in the drawing. This final override of 45° and reversal is indicated in FIGS. 3J and 3K. When switch 105 is actuated, the clutch coupled to motor 63 is disengaged and a brake is applied to stop rotation thereof.

Similarly, when it is desired to straighten the pins on a board with only a half cycle of operation of the machine, the half cycle button on control panel 12 is actuated, enabling switches 85 and 86. The brake releases, the clutch engages and the motor starts rotating commencing operation of the machine. Timing gear 81 rotates in the direction indicated by arrow 112 until lobe 82 actuates switch 86 to reduce motor speed. When lobe 82 actuates switch 85 the final override and reversing operation is performed in the same manner as described above for full cycle operation of the machine. Timing gear 81 will have rotated one-half of a turn and the positions of lobes 82 and 83 will be reversed after the half cycle is completed.

The amount of override necessary is dependent upon the hardness of the pins and the thickness of the pin board. Only 25°–35° override may be necessary for softer pins or a thin board, while 50°–65° override may be necessary when the board is relatively thick and the pins are hard.

Switches 93 and 105 may be mounted on a pivotable arm so that they are swung out of the way until they are energized. A simple plunger solenoid could be provided to control the operation of such a device. Otherwise the rollers of these switches would harmlessly be contacted by lobes 102 and 98 respectively until the switches are energized.

The composite cycle of relative motion between the pin board and lower grid plate 32 provided by the machine of this invention is depicted in FIG. 4 and may be termed changing orthogonally reciprocating motion. This figure specifically indicates each orbit of the first half of the operating cycle as shown in FIGS. 3A–3D and the overbend portion which is shown in FIGS. 3J and 3K. The orbits shown in FIGS. 3E–3H, the second half of the operating cycle, are traced by dashed lines in FIG. 4.

As an alternative, it should be recognized that the motor and automatic controls may be replaced by manual power and controls if desired. The source and type of such elements do not affect the novelty or usefulness of the invention. Further, the ends of pins 16 may be held in place while the board is moved relative to it with the same motion and the same results. Also, the types of switches and their mode of actuation may be any of several well-known means, and the half-cycle lobes 82, 83 may be mounted to the opposite side of timing gear 81 instead of using the two level lobe arrangement shown.

Having described a preferred embodiment of the invention in substantial detail, it is now likely that modifications and improvements will occur which are within the scope of this invention.

I claim:

1. A machine for straightening a multiplicity of pins extending generally perpendicularly from one side of a board, said machine comprising:

a housing;

means for removably securing said board to said housing, said pins being modularly and orthogonally spaced from each other;

means parallel to and spaced from said board coupled to said housing for simultaneously engaging all of said pins adjacent the free ends thereof; and means for providing a cycle of planar substantially nonlinear relative motion between ssid board and said engaging means in a preprogrammed series of continuously changing orbital sequences to correspondingly bend all of said pins simultaneously beyond their elastic limit throughout said cycle.

2. The machine recited in claim 1 wherein said housing includes a table and said carrying means comprises:

a first grid plate having a multiplicity of modularly spaced holes therethrough, said first grid plate being adapted to support said board with said pins extending through said holes; and a cover pivotally mounted to said housing for clamping to said table and maintaining said board firmly in place thereon.

3. The machine recited in claim 2 wherein said engaging means comprises a second grid plate having a similar multiplicity of modularly spaced holes, said second grid plate being mounted for varying orbital motion within said table parallel to and spaced from said first grid plate.

4. The machine recited in claim 3 wherein said means for causing relative motion comprises:

a source of power; and a gear train coupled between said power source and said second grid plate to move said second grid plate in a sequentially varying pattern.

5. The machine recited in claim 4 wherein said means for causing relative motion further comprises:

timing means; and means coupled to said timing means and said power source for controlling the speed and direction of rotation of said power source;

wherein said power source is a motor.

6. The machine recited in claim 5 wherein said timing means includes:

a timing gear coupled to said gear train and having switch actuating lobes mounted thereon;

a first switch connected to said controlling means and actuatable by one of said lobes, said first switch when actuated causing said motor to reduce speed near the end of the operating cycle of said machine;

a second switch connected to said controlling means and actuatable by said one of said lobes;

an override mechanism coupled to said gear train and having stopping and reversing switch actuating lobes;

a reversing switch connected to said controlling means and actuatable by said reversing lobe, said reversing switch being energized by actuation of said second switch and causing said motor to reverse its direction of rotation when actuated; and a stop switch connected to said controlling means and actuatable by said stopping lobe, said reversing switch being energized by actuation of said second switch and causing said motor to stop when actuated.

7. The machine recited in claim 6 wherein said reversing lobe is angularly adjustable with respect to said stopping lobe thereby controlling the angular distance of override before said motor is reversed and stopped at its normal position.

8. The machine recited in claim 6 wherein said timing means further includes:

first and second half-cycle switch actuating lobes mounted to said timing gear;

a first half-cycle switch connected to said controlling means and actuatable by said half-cycle switch actuating lobes, said first half-cycle switch when actuated causing said motor to reduce speed near the end of a half cycle of operation of the machine;

a second half-cycle switch connected to said controlling means and actuatable by said half-cycle switch actuating lobes, said second half-cycle switch when actuated energizing said reversing switch and said stop switch and causing said motor to reverse its direction of rotation and stop respectively when actuated.

9. The machine recited in claim 8 wherein said controlling means includes:

a full-cycle operation switch which, when actuated, energizes said first and second switches; and a half-cycle operation switch which, when actuated, energizes said first and second half-cycle switches.

10. The machine recited in claim 4 and further comprising:

a base mounted to said table beneath said first grid plate;

a pair of spaced oppositely disposed first track members mounted to said base;

a slide plate mounted for reciprocal sliding motion between said first track members;

a pair of spaced oppositely disposed second track members mounted to said plate; and an orbiting base mounted for reciprocal sliding motion between said second track members, said second track members being orthogonal to said first track members, said second grid plate being mounted to said orbiting base for movement therewith.

11. The machine recited in claim 10 and further comprising:

a first connecting link pivotably mounted to said slide plate and extending in a direction generally parallel to said first track members;

a second connecting link pivotally mounted to said orbiting base and extending in a direction generally parallel to said second track members;

a first eccentric coupled between said first connecting link and a first gear of said gear train; and a second eccentric coupled between said second connecting link and a second gear of said gear train;

said second gear being caused to rotate at a speed which is different from the speed of rotation of said first gear, thereby causing said second grid plate to assume a varying planar orbital motion during operation of said machine.

12. A machine for straightening a multiplicity of pins extending generally perpendicularly from one side of a board, said pins being modularly and orthogonally spaced from each other, said machine comprising:

a housing;

a table mounted to said housing;

a cover pivotably mounted to said housing for clamping to said table and holding said board firmly in place thereon;

a first grid plate secured to said table and having a multiplicity of modularly and orthogonally spaced holes therethrough, said first grid plate being adapted to support said board with said pins extending through said holes;

a second grid plate having a like multiplicity of modularly and orthogonally spaced holes and being movably mounted to said table parallel to and spaced from said first grid plate, said holes in said second grid plate engaging said pins adjacent to the free ends thereof;

a motor mounted within said housing;

a gear train coupled between said motor and said second grid plate so as to move said second grid plate in a sequentially varying pattern of continuously changing orbital sequences with respect to said first grid plate;

timing means; and controlling means coupled to said timing means and said motor for controlling the operation of said machine, including the speed and direction of rotation of said motor;

whereby said machine simultaneously bends said pins beyond their elastic limit in said changing orbital sequences followed by an override sequence of bend said pins past the perpendicular position sufficiently so that they will all become perpendicular to said board when returned to center.

13. The machine recited in claim 1 and further including means for providing an overridge sequence after said changing orbital sequences are completed whereby said machine continues through a small portion of the first of said changing orbital sequences and returns to its normal position to leave said pins parallel to one another and perpendicular to said board.

* * * * *

UNITED STATES PATENT OFFICE
CERTIFICATE OF CORRECTION

Patent No. 3,779,291 Dated December 18, 1973

Inventor(s) Herbert G. Yeo

It is certified that error appears in the above-identified patent and that said Letters Patent are hereby corrected as shown below:

Column 2, line 19, "adustable" should read --adjustable--.

Column 8, line 18, "carrying" should read --securing--.

Column 10, line 42, "of" should read --to--;

Column 10, line 47, "overridge" should read --override--.

Signed and sealed this 9th day of April 1974.

(SEAL)
Attest:

EDWARD M.FLETCHER,JR.
Attesting Officer

C. MARSHALL DANN
Commissioner of Patents

FORM PO-1050 (10-69)

USCOMM-DC 60376-P69
★ U.S. GOVERNMENT PRINTING OFFICE : 1969 O—366-334

318